June 17, 1969  R. M. KING  3,449,906
BRACELETS
Filed Jan. 29, 1968
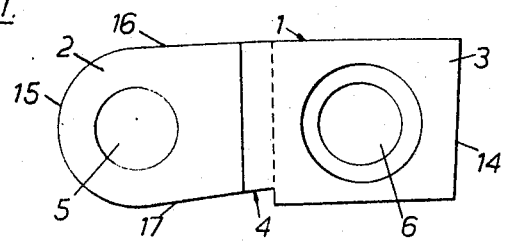
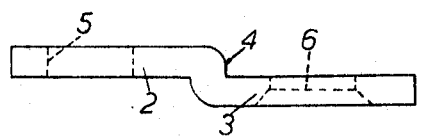
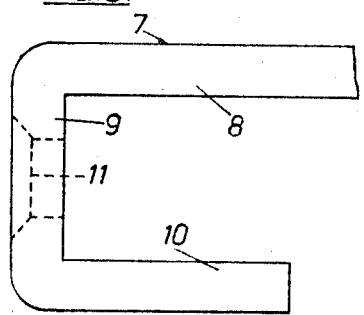
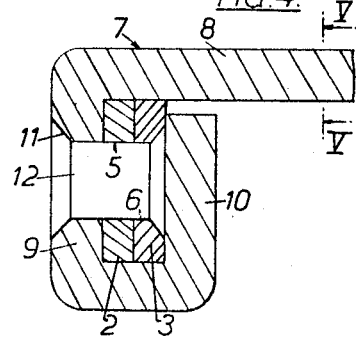
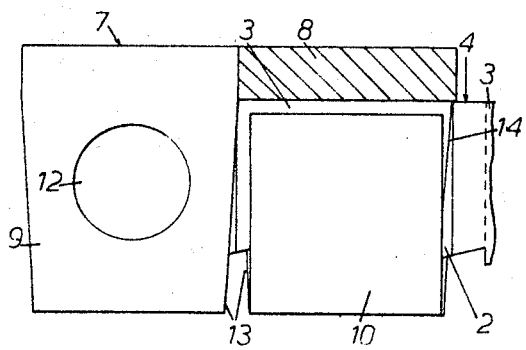
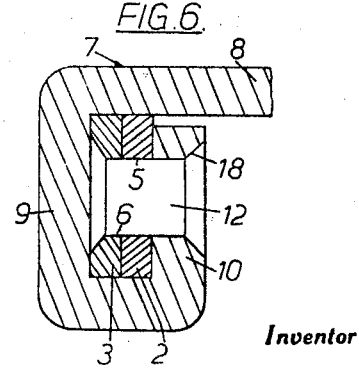
Inventor
Roger Milner King
By
Pierce, Schiffler & Parker
Attorneys

United States Patent Office 3,449,906
Patented June 17, 1969

3,449,906
BRACELETS
Roger M. King, Watford, England, assignor to Milner King, Hertfordshire, England, a British company
Filed Jan. 29, 1968, Ser. No. 701,340
Claims priority, application Great Britain, Nov. 13, 1967, 51,502/67
Int. Cl. A44c 5/00
U.S. Cl. 59—78                                    9 Claims

ABSTRACT OF THE DISCLOSURE

A flexible bracket wherein the links are connected by connector members, one, connecting end of which is secured within the link by a tie member and the other, pivoting end of which is pivotally carried on the tie member between the side wall of a link and the connecting end of another connector member.

BACKGROUND OF INVENTION

This invention concerns improvements in or relating to the construction of bracelets comprising a series of interconnected link members.

It is often quite apparent by a casual glance at such a bracket as to how the interconnection is achieved and, although, in some cases, the manner of interconnection can be incorporated into the design of the bracelet in an aesthetic manner, in other cases the appearance of the means whereby the link members are interconnected does not add to the attractiveness of the brackelet. On the other hand, unobtrusive and/or attractive interconnecting means are usually relatively expensive, especially since they may require several differing parts to be used for each interconnection so that several forming dies, etc. are required, one for each part, and assembly tends to be intricate.

SUMMARY OF THE INVENTION

It is an object of this invention to provide a braclet, formed of interconnected link members, which is attractive in appearance while being fairly easy to construct from few parts to form a bracelet in which the manner of interconnection is relatively unobtrusive.

This invention provides a flexible bracelet formed of a series of adjacent link members interconnected by connector members, in which each connector member has a connecting end and a pivoting end wherein the connecting end is inwardly displaced of the pivoting end by an amount greater than the thickness of the connector member, and in which each link member comprises a surface portion with an arm depending normally from each side thereof, the pivoting end of one connector member being pivotally disposed upon a tie member coupling an arm of a link member and the connecting end of a further connector member which are located on either side of the pivoting end of said one connector member.

Such a bracelet incorporates only three types of parts, namely link member, connector member and tie member and is easily constructed by placing the link members and connector members together and inserting the tie member. When assembled, the main linkages of the bracelet are hidden inside the link members.

Preferably the free end of each arm of a link member will further extend inwardly and parallel to the surface portion thereof to mask the edges of the connector members at the lower surface of the bracelet. This protects the arm of the wearer from possible rubbing or pinching by edges of the link and/or connector members. Still more preferably each arm will extend so far as to wrap around the connector members and thus almost meet up with the inner face of the surface portion of the link member. This enables the main construction of the interconnection to be hidden from the wearer.

The tie member is desirably a rivet passing through the three inter-coupled parts. The rivet can be fixed between the outer surface of the arm and the outside surface of the connecting end of the further connector member, with the pivoting end of the one connector member being able to pivot about the central portion of the rivet. If the arm wraps around the ends of the two connector members, then the rivet can ideally be fixed between the connecting end of the other connector member (which in this case will be nearest to the depending arm of the link member) and the wrapped-around end of the arm, with the pivoting end of the one connector member again being able to pivot about the central portion of the rivet.

The connecting end of each connector member is best formed so that, when secured in position by the tie member, the upper edge of the connector member is flush with the inner face of the surface portion of the link member and so cannot rotate even if the coupling with the tie member should become loose. The pivoting end of each connector member should ideally be formed as to be semicircular on a radius about the pivot point (on the axis of the tie member) so that it will not collide with surfaces of the link member when pivoted about the tie member. Obviously there will be some clearance play between adjacent link members, which will allow a certain amount of flexing. Preferably, however, the ends of each arm of the link member (and associated parts) will taper inwardly towards one another, away from the surface portion of each link member so that the link members can pivot toward one another on the inside of the bracelet.

BRIEF DESCRIPTION OF THE DRAWINGS

In order that the invention may be fully understood preferred embodiments thereof will now be described, by way of illustration only, with reference to the accompanying drawings, in which:

FIGURE 1 is a side view of a preferred form of connector member;

FIGUURE 2 is a plan view of the connector member shown in FIGURE 1;

FIGUURE 3 is an end view of part of a link member to be used with the connector members of FIGURES 1 and 2;

FIGURE 4 is a vertical cross-section showing the interconnection of a link member of FIGURE 3 and two connector members of FIGURES 1 and 2 in an assembled bracelet;

FIGURE 5 is a side view of two assembled link members in a bracelet with part of one link member cut away on line V—V of FIGURE 4; and FIGURE 6 is a view similar to that of FIGURE 4 showing a modification of the rivet position.

DESCRIPTION OF THE PREFERRED EMBODIMENTS

Referring now to FIGURES 1 and 2 of the drawings a connector member 1 is shown with a pivoting end 2 and a connecting end 3 displaced inwardly of the pivoting end at 4 by an amount slightly more than the thickness of the connecting member 1. A hole 5 is drilled straight through the pivoting end 2 and a countersunk hole 6 is drilled through connecting end 3. FIGURE 3 shows the link member 7 which has a surface portion 8 (which extends to any desired width for the bracelet to be assembled) and a depending arm 9 on each side (wherein the left hand side arm only is shown in the drawing). The arm 9 has an extension 10 which lies parallel with the surface portion 9 before assembly. In arm 9 is drilled a countersunk hole 11.

FIGURE 4 shows how the link member 7 and two connector members 1 are assembled together in a bracelet by means of a rivet 12. The pivoting end 2 of one connector member is placed next to arm 9 and the connecting end 3 of another connector member is then placed in line so that the rivet 12 can then be passed through aligned holes 11, 5 and 6. The ends of the rivet are then fixed in well-known manner. Finally the extension 10 is wrapped around the assembled connector members 1 to cover over the assembled pieces and both hide the manner of interconnection and provide a smooth finish on the inner surfaces of the bracelet.

FIGURE 5 shows, in side view how the assembled parts appear both from the inside and from the outside. It will be noted that the lower portions 13 of the arms 9 at the end of each link member 7 taper inwardly to allow the bottom ends of the link members 7 to pivot towards one another. A similar taper is present on the end 14 of connecting end 3 of the connector member 1 (see particularly FIGURE 1). Also, as shown in FIGURE 1, the end of pivoting end 2 of the connector member 1 has a semi-circular profile 15 whose radius lies on the axis of the hole 5 so that the pivoting end can freely rotate about rivet 12 when assembled. Also, the sides 16, 17 of pivoting end 2 are tapered to assist in the rotation.

It will be appreciated that, with the construction just described with reference to the drawings, the connecting arrangement is quite unobtrusive even upon viewing the inside of the bracelet. Admittedly, the head of rivet 12 shows on the surface of arms 9 but this can virtually be hidden by polishing the metal. However, the modification shown in FIGURE 6 indicates how even this can be overcome by having a countersunk hole 18 for the rivet in arm extension 10 so that arm 9 can be left solid as shown. From FIGURE 6 it will be seen that the positions of pivoting end 2 and connecting end 3 (as compared with FIGURE 4) have to be interchanged so that the rivet 12 is secured between connecting end 3 (the countersunk part of hole 6 being nearest to arm 9) and arm extension 10 so that the only showing part of the rivet is inside the finished bracelet.

I claim:
1. A flexible bracelet comprising a combination of link members, connector members and tie members, in which each connector member has a connecting end and a pivoting end, wherein the connecting end is inwardly displaced of the pivoting end by an amount greater than the thickness of the connector member, and in which each link member comprises a surface portion with an arm depending normally from each side thereof, the integers being interconnected by the pivoting end of one connector member being pivotally disposed upon a tie member, which tie member couples an arm of a link member and the connecting end of a further connector member, which are located on either side of the pivoting end of said one connector member.

2. A flexible bracelet according to claim 1 in which the free end of each arm of a link member further extends inwardly and parallel to the surface portion thereof to mask the edges of the connector members at the lower surface of the bracelet.

3. A flexible bracelet according to claim 2 in which each arm extends so far as to wrap around and thus enclose the connector members.

4. A flexible bracelet according to claim 2 in which each arm extends so far as to wrap around and thus enclose the connector members and said tie member is fixed between the connecting end of said other connector member and the wrapped around end of the arm with the pivoting end of said one connector member being able to pivot about the central portion of said tie member.

5. A flexible bracelet according to claim 1 in which said tie member is fixed between the outer surafce of an arm and the inner surface of the connecting part of said other connector member, with the pivoting end of said one connector member being able to pivot about the central portion of said tie member.

6. A flexible bracelet according to claim 1 in which the connecting end of each connector member is formed so that the upper edge thereof is flush with the inner face of the surface portion of the link member and so cannot rotate.

7. A flexible bracelet according to claim 1 in which the pivoting end of each connector member is formed so as to be semi-circular on a radius about the pivot point on the axis of the tie member.

8. A flexible bracelet according to claim 6 in which the pivoting end of each connector member is formed so as to be semi-circular on a radius about the pivot point on the axis of the tie member.

9. A flexible bracelet according to claim 1 in which the ends of each arm of the link member, and associated parts, taper inwardly towards one another away from the surface portion of each link member.

References Cited

UNITED STATES PATENTS

| | | | |
|---|---|---|---|
| 1,152,476 | 9/1915 | Bixby | 59—78 |
| 1,239,232 | 9/1917 | Taylor | 59—78 |
| 1,755,252 | 4/1930 | Goeser | 59—78 |

FOREIGN PATENTS 1,141,005   3/1957   France.

CHARLES W. LANHAM, *Primary Examiner.*

G. P. CROSBY, *Assistant Examiner.*

U.S. Cl. X.R.

59—82, 91